United States Patent Office 3,324,115
Patented June 6, 1967

3,324,115
CYCLIC DERIVATIVES OF AZA-BENZO-
CYCLOHEPTENES
Frank J. Villani, West Caldwell, N.J., assignor to Schering
Corporation, Bloomfield, N.J., a corporation of New
Jersey
No Drawing. Filed Jan. 15, 1965, Ser. No. 425,954
17 Claims. (Cl. 260—239.3)

This invention relates to compositions of matter classified in the art of chemistry as polycyclic amides and polycyclic amines, to methods for their manufacture and to methods for their use. These novel compounds are of particular value as chemical intermediates useful in the preparation of compositions of matter having valuable therapeutic properties as determined by pharmacological evaluation. The invention sought to be patented in its composition aspect is defined as residing in the concept of a composition of matter having the molecular structure represented by the folowing formula:

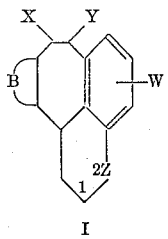

I wherein B, together with the carbon atoms to which it is attached is a fused pyridine ring X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

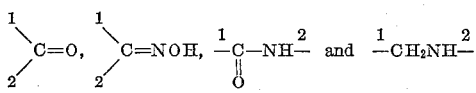

with the numbers 1 and 2 relating the bonds of the substituent Z to the structural formula.

The starting material for the preparation of the compounds X of Formula I is an aza-5H-dibenzo-[a,d]-cycloheptene or a 10,11-dihydro analog thereof of the formula:

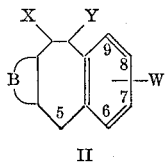

II wherein B, W, X and Y are as above defined. These starting materials are prepared as described in copending application, Ser. No. 330,244, filed Dec. 13, 1963. Representative of these starting materials are: 1-aza-5H-dibenzo-[a,b]-cycloheptene, 2-aza-5-H-dibenzo-[a,d]-cycloheptene, 3-aza-5H-dibenzo-[a,d]-cycloheptene, 4-aza-5H-dibenzo-[a,d]-cycloheptene and their respective 10,11-dihydro analogs. In addition these starting materials may contain a substituent in the benzenoid portion in one or more of positions 7-, 8- and 9- (referring to Formula II), said substituent W being as above defined. These substituted starting materials are prepared also as the unsubstituted analogs and are such that the substituent is nonreactive to the transformations carried out as described herein below and alter the properties of the final products merely in degree rather than kind.

The tangible embodiments of this invention have been described as being valuable intermediates in the preparation of chemical compounds which themselves have therapeutic properties determined by pharmacological evaluation. It is to be understood that by the term "intermediate" is meant a chemical substance which either is itself transformable into a therapeutically useful end product or a chemical product which is a precursor of a further intermediate which may be transformed into the therapeutic end product. It will be shown that most of the compounds described and claimed herein are actually precursors of other compounds disclosed and claimed herein.

For the purpose of clarity, the various transformations leading to the preparation of the tangible embodiments of this invention and their conversion into therapeutically useful substances will be shown as applied to the starting material 4-aza-10,11-dihydro-5H-dibenzo-[a,d]-cycloheptene, a compound of general Formula II when B together with the carbon atoms to which it is attached represents a fused pyridine ring having the nitrogen atom in the 4-position and wherein W, X and Y each represent hydrogen. It is to be understood, however, that is specifically for the purpose of exemplification and that any of the starting materials described by general Formula II may be equally utilized to give rise to the corresponding tangible embodiment of Formula I.

The first step in the synthesis of the tangible embodiment of Formula I is to prepare that embodiment wherein Z represents carbonyl. This reaction sequence is depicted as follows:

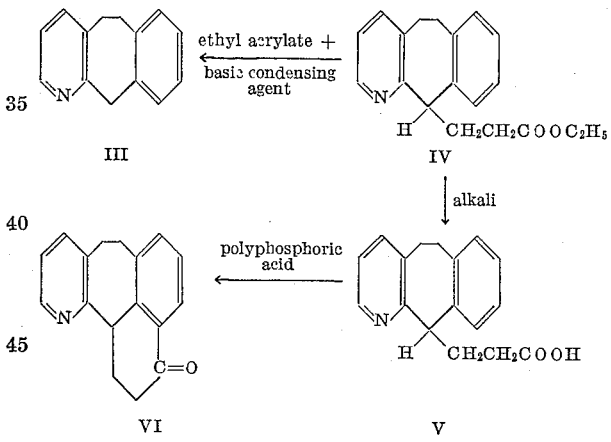

4-aza-10,11-dihydro-5H-dibenzo-[a,d]-cycloheptene (III) is condensed with ethyl acrylate in the presence of a basic condensing agent such as Triton B giving rise to the carbethoxyethylated substance, IV. Saponification of the carbethoxylate, (IV), preferably with alkali, yields the corresponding carboxylic acid, (V), which is isolated from the reaction mixture by the useual techniques. The carboxylic acid (V) lends itself readily to an internal Friedel-Crafts reaction whereby cyclization occurs resulting in the formation of the ketone (VI), said ketone being the tangible embodiment of general Formula I. The cyclization reaction is carried out directly upon the carboxylic acid, preferably by heating the acid with polyphosphoric acid or concentrated hydrofluoric acid. Alternatively, the acid may be converted to its acid chloride by means of thionyl chloride and a normal Friedel-Crafts reaction performed on said acid chloride using aluminum chloride as condensing agent. In place of ethyl acrylate in the foregoing reaction, an equivalent thereof, such as acrylonitrile, may be utilized and it is readily apparent to one skilled in the art that the nitrile group may be hydrolyzed to a carboxyl group thus producing the compound, V. It will be also apparent to one skilled in the art that a compound such as VI containing nonreactive substituents such as methyl groups in the ring containing the carbonyl function are prepared according to the foregoing by utilizing the appropriately substituted acrylic acid ester or acrylonitrile.

The carbonyl compound, VI, is derivatized by the formation of its oxime, VII, by heating the ketone with hydroxyl amine hydrochloride in an appropriate solvent. The oxime (VII) upon being subjected to a Beckmann rearrangement by heating with an acid such as polyphosphoric acid at an elevated temperature undergoes transformation into the amide, VIII. The amide, VIII, is transformable into the corresponding amine (IX) by reduction such as with lithium aluminum hydride. This series of transformations is depicted in the following reaction scheme:

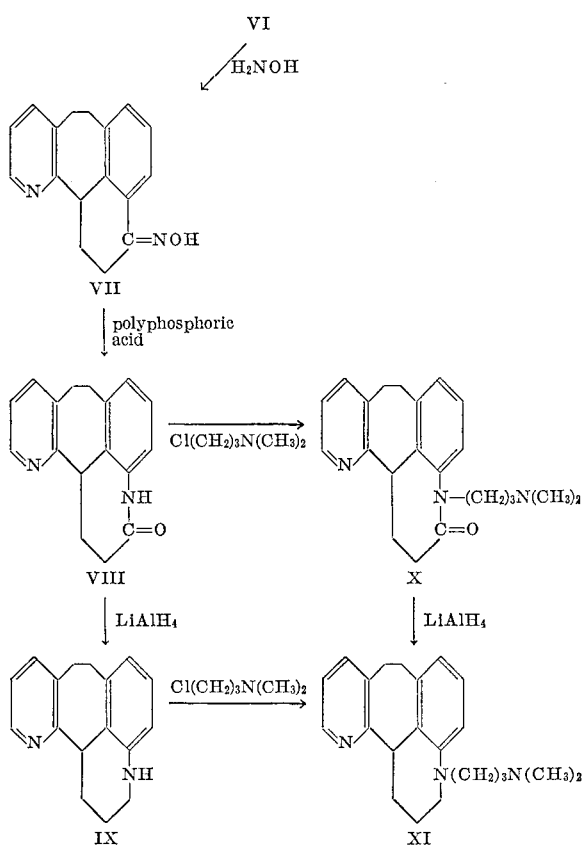

It is to be noted that VII, VIII and IX all are representative of the tangible embodiment of Formula I.

Instead of transforming the cyclic amide, VIII, into the cyclic amine, IX, said cyclic amide may be alkylated such as with dimethylaminopropylchloride in the presence of a basic condensing agent giving rise to the N-dimethylaminopropyl analog, X. This compound and its obvious analogs such as pyrrolidinopropyl, piperidinopropyl and the like are of value as central nervous system stimulants and accordingly may be used as antidepressants. Quaternization of a compound represented by X gives rise to a bisquaternary salt such as would be formed with the reaction with a lower alkyl halide such as methyl iodide or methyl bromide. These quaternary salts are of value as antibacterial agents and may be used to sterilize animate and inanimate surfaces contaminated with bacterial organisms.

The cyclic amine, IX, may also be N-alkylated as was the cyclic amide, VIII, under conditions modified for the fact that the reactant is an amine. For example, reaction of the cyclic amine, IX, with dimethylaminopropyl chloride hydrochloride in the presence of a base such as potassium carbonate gives rise to the dimethylaminopropyl analog, XI. This diamine, XI, also acts upon the central nervous system as determined by pharmacological evaluation and exhibits a stimulant effect and accordingly this compound is useful as an antidepressant. Quaternization of XI gives rise to a triquaternary salt which possesses antibacterial properties. The transformation of VIII to X and IX to XI is shown in the reaction scheme above. It is evident that instead of reducing the amide, VIII, to produce the amine, IX, and then alkylating said amine, an alternative route would be the alkylation of VIII to yield X which itself upon hydrogenation with lithium aluminum hydride, for example, gives rise to the diamine, XI.

It is thus evident from the foregoing that the tangible embodiment of the compounds of Formula I are valuable building blocks in the synthesis of other chemical substances such as, for example, shown above. The compounds of Formula I, wherein Z is a nitrogen containing substituent such as would be evidenced by compounds VIII and IX possess valuable reactive centers and functions in the form of the amino and amido groups. These reactive centers lend themselves readily to building up further compounds in which it is desired to have such reactive centers as well as a fused heterocyclic system such as appears in these compounds.

The following examples are representative of means for the preparation of the tangible embodiments of this invention and the conversion thereof into additional compounds of value:

EXAMPLE 1

*Preparation of the carbethoxylate, IV*

To a mixture of 5 g. of 4-aza-10,11-dihydro-dibenzo-[a,d]-cycloheptene and 2 ml. of benzyl trimethylammoniummethyl ether, add dropwise with stirring, 50 ml. of ethyl acrylate at such a rate that temperature does not exceed 40° C. Stir at room temperature for 4.5 hours. Add 300 ml. of ether and extract the solution with 10% aqueous hydrochloric acid. Neutralize the aqueous extracts with ammonium hydroxide and extract with chloroform. Remove the chloroform in vacuo. The product of this example is obtained by distillation in vacuo, B.P. 138–141°/0.5 mm. $n_D^{28}$ 1.5963.

EXAMPLE 2

*Preparation of the carboxy compound, V*

Heat on a steam bath for 10 hours a mixture of 26.7 g. of the ester from Example 1, 35 g. of NaOH, 35 ml. of $H_2O$, 300 ml. of ethanol. Remove the solvent on steam bath by distilling in vacuo. Add 200 ml. of water to the residue, acidify with glacial acetic acid and filter. The carboxy compound of this example is purified by recrystallization from benzene-acetone, M.P. 168–170° C.

EXAMPLE 3

*Preparation of the polycyclic ketone, VI*

Heat on the steam bath for 2 hours with stirring 18.8 g. of the acid from Example 2 with 1 kg. of polyphosphoric acid. Pour the mixture onto ice (about 2 kg.) and render it strongly basic with sodium hydroxide solution. Extract the mixture with chloroform. Wash the chloroform solution with water and concentrate to a residue. Recrystallize the residue from isopropyl ether obtaining the compound of this example, M.P. 162–163° C.

EXAMPLE 4

*Preparation of the oxime, VII*

Stir and heat a mixture of 15.5 g. of the ketone from Example 3, 15 g. of hydroxylamine hydrochloride, 70 ml. of ethanol and 70 ml. of pyridine at reflux for four hours. Remove the solvents by concentrating in vacuo. Add water to the residue and allow crystallization to occur. Filter and recrystallize from ethanol obtaining the oxime of this example, M.P. 229–230° C.

EXAMPLE 5

*Preparation of the amide, VIII*

Heat a mixture of the oxime (9.5 g.) from Example 4 and 400 g. of polyphosphoric acid at 150–155° for 10 minutes. Pour the mixture onto ice and add excess ammonium hydroxide. Extract the mixture with methylene chloride and wash the extracts with water. Dry the methylene chloride solution over anhydrous sodium sulfate, filter and concentrate to a residue. Crystallize from benzene obtaining the product of this example, M.P. 191–193° C.

EXAMPLE 6

*Preparations of the cyclicamine, IX*

Add a hot solution of 2.6 g. of the cyclic amide of Example 5 in 50 ml. of ether to a suspension of 0.7 g. of lithium aluminum hydride in 100 ml. of refluxing ether. Reflux for 6–8 hours, cool, add water and stir. Extract the mixture with ether, dry the ether extracts and distill in vacuo at about 0.5 to 1 mm. pressure to obtain the amine of this example, B.P. 140–145°/1 mm.

EXAMPLE 7

*Preparation of the alkylated amide, X*

Under reflux with stirring, heat a mixture of 0.9 g. sodium hydride (50% in mineral oil), 50 ml. of dioxane (dried over calcium hydride) and 2.9 g. of the amide of Example 5 for two hours. Add 2.1 g. of freshly distilled 3-dimethylaminopropyl chloride and stir and reflux overnight. Remove the dioxane and add 20 ml. of benzene and then add about 20 ml. of water. Stir and then separate the benzene layer. Concentrate to a residue. Triturate the residue with hexane, filter and recrystallize from isopropyl ether obtaining the product of this example, M.P. 145–146.5° C.

EXAMPLE 8

*Preparation of the Alkylated Amine, XI*

To a suspension of 0.6 g. lithium hydride in 10 ml. of absolute ether, add dropwise a solution of 2 g. of the alkylated amide of Example 7 in 16 ml. of ether. Reflux with stirring for 10 hours. Add water and extract the product with ether. Dry the ether, evaporate to a residue and distill obtaining the product of this example, B.P. 187–190° C. (0.5 mm.).

Alternatively, the alkylated amine of this example is prepared as follows:

Heat under reflux with stirring for 10–14 hours a mixture of 5 g. of the amine of Example 6, 2.2 g. dimethylaminopropyl chloride hydrochloride, 5.5 g. anyhydrous potassium carbonate and 250 ml. of xylene. Cool and filter. Remove the xylene by concentration in vacuo and distill the product.

By varying the starting materials in Example 1, that is by utilizing a compound of the formula:

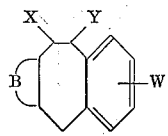

wherein B, W, X and Y are as described heretofore, the corresponding tangible embodiment of this invention having the same substituents as the starting material is obtained. For example, in Example 1, by substituting 3-aza-10,11-dihydro-dibenzo-[a,d]-cycloheptene for the 4-aza analog and following the procedures of Examples 1 through 8, the analagous compounds having the pyridyl nitrogen atom in the 3-position are prepared. Representative of these starting materials, prepared as described in my copending application 330,244 filed Dec. 13, 1963, are as follows:

I. 1-aza-5H-dibenzo-[a,d]-cycloheptene of the formula:

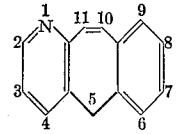

II. The 10,11-dihydro analogs of the compounds of Group I.

III. The compounds of Group I and II containing the substituent W in one of the positions 7–9 wherein W is H, halogen (preferably Cl or Br), trifluoromethyl, lower alkyl (preferably methyl) and lower alkoxy.

IV. 2 - aza - 5H - dibenzo - [a,d] - cycloheptene of the formula:

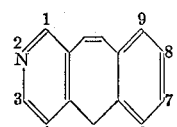

V. The 10,11-dihydro analogs of the compounds of Group IV.

VI. The compounds of Groups IV and V containing the substituent W in one of the positions 7–9 wherein W is H, halogen (preferably Cl or Br), trifluoromethyl, lower alkyl (preferably methyl) and lower alkoxy.

VII. 3 - aza - 5H - dibenzo [a,d] - cycloheptene of the formula:

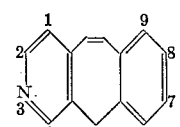

VIII. The 10,11-dihydro analogs of the compounds of Group VII.

IX. The compounds of Groups VII and VIII containing the substituent W in one of the positions 7–9 wherein W is H, halogen (preferably Cl or Br), trifluoromethyl, lower alkyl (preferably methyl) and lower alkoxy.

X. 4 - aza - 5H - dibenzo - [a,d] - cycloheptene of the formula:

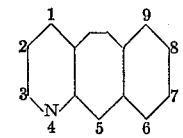

XI. The 10,11-dihydro analogs of the compounds of Group XI.

XII. The compounds of Groups X and XI containing the substituent W in one of the positions 7–9 wherein W is H, halogen (preferably Cl or Br), trifluoromethyl, lower alkyl (preferably methyl) and lower alkoxy.

I claim:
1. A compound of the formula:

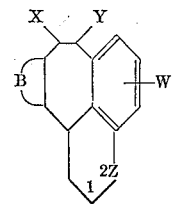

wherein B, together with the carbon atoms to which it is attached is a fused pyridine ring, X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

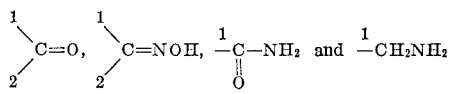

with the numbers 1 and 2 relating the bonds of the substituent Z to the structural formula.

2. A compound of claim 1 of the formula:

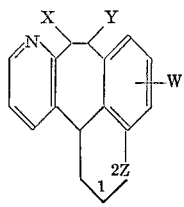

wherein X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

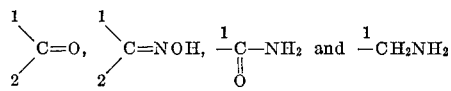

with the numbers 1 and 2 relating the bonds of the substituent Z to the structural formula.

3. A compound of claim 1 of the formula:

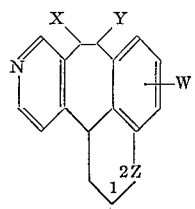

wherein X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

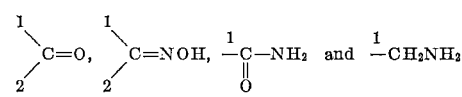

with the numbers 1 and 2 relating the bonds of the substituent Z to the structural formula.

4. A compound of claim 1 of the formula:

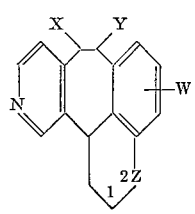

wherein X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

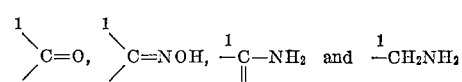

with the numbers 1 and 2 relating the bonds of the substituent Z to the structural formula.

5. A compound of claim 1 of the formula:

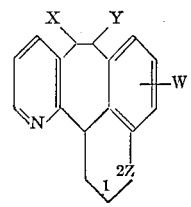

wherein X and Y are hydrogen and when taken together are an additional bond between the carbon atoms to which they are attached, W is a member of the group consisting of H, Cl, Br, $CF_3$, lower alkyl and lower alkoxy, Z is a member of the group consisting of

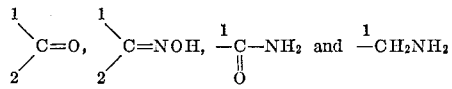

with the numbers 1 and 2 relating the bonds of the substituent Z to the structural formula.

6. A compound of claim 1 of the formula:

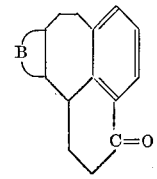

wherein B is a fused pyridine ring.

7. A compound of claim 1 of the formula:

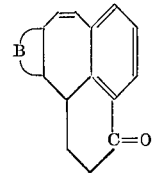

wherein B is a fused pyridine ring.

8. A compound of claim 1 of the formula:

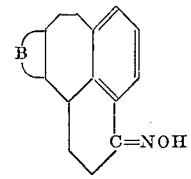

wherein B is a fused pyridine ring.

9. A compound of claim 1 of the formula:

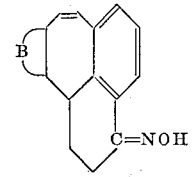

wherein B is a fused pyridine ring.

10. A compound of claim 1 of the formula:

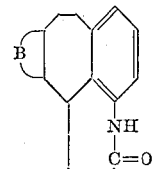

wherein B is a fused pyridine ring.

11. A compound of claim 1 of the formula:

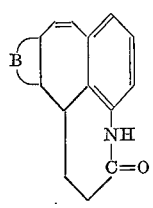

wherein B is a fused pyridine ring.

12. A compound of claim 1 of the formula:

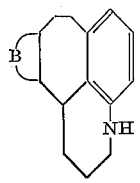

wherein B is a fused pyridine ring.

13. A compound of claim 1 of the formula:

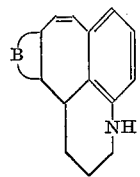

wherein B is a fused pyridine ring.

14. A compound of claim 1 of the formula:

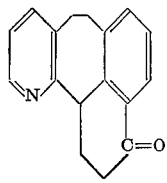

15. A compound of claim 1 of the formula:

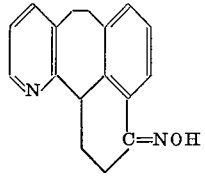

16. A compound of claim 1 of the formula:

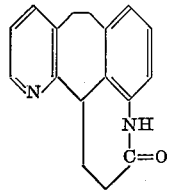

17. A compound of claim 1 of the formula:

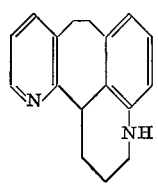

No references cited.

WALTER A. MODANCE, *Primary Examiner.*
ROBERT T. BOND, *Assistant Examiner.*